United States Patent Office 3,158,672
Patented Nov. 24, 1964

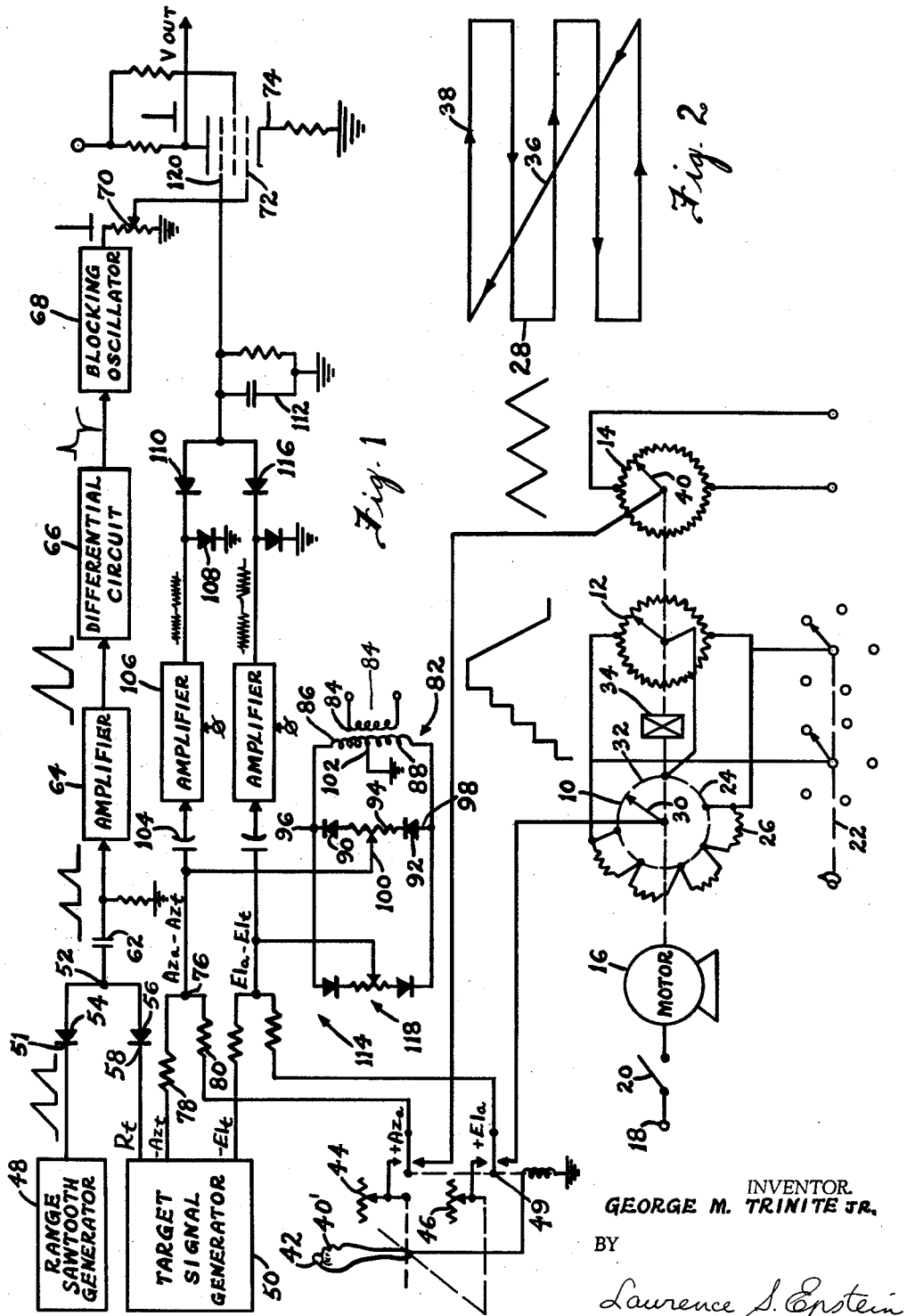

3,158,672
ANTENNA BEAM WIDTH SIMULATOR
George M. Trinite, Jr., Sykesville, Md., assignor, by mesne assignments, to the United States of America as represented by the Secretary of the Navy
Filed Mar. 8, 1962, Ser. No. 178,516
8 Claims. (Cl. 35—10.4)

This invention relates to simulators and more particularly to the simulation of electromagnetic detection devices.

Generally a target signal may be generated which will produce a signal that is representative of the position of target with respect to a searching vehicle. However, whether or not this target will appear on a radar scope in the searching vehicle will depend on the orientation of the radar antenna and its electromagnetic beam with relationship to the target vehicle.

Therefore, an object of the present invention is to provide a means of simulating the orientation of a radar antenna and the width of the antenna beam.

Another object of the present invention is to provide means for determining whether the orientation of the radar antenna is such, that the target lies within the beam of the radar antenna.

Other objects and many of the attendant advantages of this invention will be readily appreciated as the same becomes better understood by reference to the following detailed description when considered in connection with the accompanying drawings wherein:

FIG. 1 is a schematic diagram of the present invention; and

FIG. 2 is a pattern of the generated voltages which represent antenna scan position.

Referring to the drawings, the pattern shown in FIG. 2 is generated by driving the elevation potentiometers 10 and 12 and azimuth potentiometer 14 with the constant speed motor 16. The motor 16 is excited by a power supply 18 coupled to it by the closing of a switch 20. The two elevation potentiometers 10 and 12 are excited by a selector switch 22 which selects different ranges of excitation voltage to correspond with the various sectors to be scanned. The first of the elevation potentiometers 10 is a six-segment commutator switch 24 with resistors 26 connected between five segments and the output of the selector switch so that as the arm rotates five discrete voltage levels corresponding to the vertical positions 28 of the five horizontal scanning lines are produced at the arm 30 of the potentiometer. The sixth segment 32 is connected to the second of the altitude scan potentiometers 12 which is a linear potentiometer. Gearing 34 between this potentiometer 12 and the segmented potentiometer 10 is such that while the arm 30 of the segmented potentiometer 10 is electrically coupled to the sixth segment 32, the linear potentiometer 12 sweeps its complete range of voltage producing a vertical component of the retrace line 36.

To produce the azimuth scan voltage 38, the linear azimuth potentiometer 14 is excited from a plus and minus 150 volt source. As the arm 40 rotates, it produces a back-to-back sawtooth voltage. The gearing 32 between this potentiometer 14 and the segment potentiometer 10 is such that this potentiometer makes one-half a revolution, covering its complete range, during the time that the arm of the segmented potentiometer is passing over one of its segments. In this manner the back and forth motion of the sweep 38 is simulated. The antenna search pattern shown in FIG. 2 can be derived from these voltages by plotting the output of the segmented potentiometer 10 along the vertical and the output of the azimuth potentiometer 14 along the horizontal. This would correspond, as graphically illustrated in FIG. 2, to an X–Y plot, with the azimuth with respect to time plotted along the horizontal, the X axis, and the elevation with respect to time plotted along the vertical, the Y axis. This resultant plot can be described as a number of horizontal parallel lines, indicating azimuth, joined together alternately at one end then the other by vertical lines representative of elevation, with a diagonal line joining points indicative of maximum and minimum elevation to form a continuous zig-zag line joined at its extremities by a diagonal.

To permit simulation of antenna under control of the radar operator, a gunner's control handle 40 is provided. When an action switch 42 on the gunner's control handle 40 is pressed, antenna motion is simulated by the output of potentiometers 44 and 46 sensitive to the motion of the gunner's control handle. The action switch 42 activates a searching relay 49 which switches the elevation and azimuth outputs $El_a$ and $Az_a$ respectively from the output of the driven azimuth and elevation potentiometers 10 and 14 to the two potentiometers 44 and 46 which provides voltages proportional to the gunner's control handle 40 movements; one potentiometer 46 corresponding to the forward and backward movement of the handle and one potentiometer 44 corresponding to a sideways movement of the handle. With the back and forth motion of the gunner's handle the first potentiometer 46 produces a voltage analogous to the positioning of the antenna's vertical position, while the sideways motion of the gunner's control handle produces a voltage out of the second potentiometer 44 analogous to the antenna's horizontal position.

Before a target can appear on scope presentations it must appear to meet two major requirements: the target must be within the range of radar equipment and the antenna must be trained and elevated so that it is on target. Range determination takes place by the comparison of a linear range sawtooth output of the sawtooth generator 48 where the length of the sawtooth is equal to the range of the radar, with the output of a target generator 50 of the type where the range signal's magnitude is a function of target range. This comparison takes place at the junction 52 of two diodes 54 and 56 coupled back-to-back with the cathode 58 of one diode connected to the target signal generator 50 and the cathode of the other connected to the sawtooth generator 48. The target signal generator 50 feeds the first diode 56 the range information while the linear sawtooth voltage from the sawtooth generator 48 is fed to the other diode 54. The range voltage on the first diode 56 biases this second diode 54 off until the sawtooth voltage exceeds the value of the range voltage. Once the value of the sawtooth voltage exceeds the range voltage the second diode 54 remains open until the end of the sawtooth pulse passing through that portion of the sawtooth voltage that exceeded the range voltage in magnitude. A blocking capacitor 62 which normally blocks the D.C. range voltage passes this short period range pulse to an amplifier 64 and to a differentiating circuit 66 which produces from the pulse a positive spike for the leading edge of the pulse and a negative spike for the trailing edge. The positive spike triggers a blocking oscillator 68 so that the blocking oscillator produces a micro-second pulse which may be adjusted by an output potentiometer 70. This pulse is passed to the grid 72 of a pentode 74.

The comparison of the target's azimuth position with that of the antenna takes place at the junction 76 of two resistors 78 and 80. The first of these resistors 78 is connected to the target signal generator 50 where it receives information proportional to the negative of the target's azimuth position $-Az_t$, while the other resistor 80 is coupled to positive azimuth antenna signal $Az_a$. The voltage produced at the junction of these two resistors is the difference between these two D.C. azimuth voltages Az$_a$ and Az$_t$. This voltage is applied to the bridge circuit 82 and controls the amplitude of the bridge A.C. output. The A.C. excitation 84 for the bridge is obtained from an oscillator. The output of the oscillator is coupled through a transformer 84 which forms two legs 86 and 88 of the bridge. The other two legs of the bridge are formed by two diodes 90 and 92 and a potentiometer 94. These elements being arranged with the cathode 96, one diode and the plate 98 of the other, each connected to an end of the legs 86 and 88 of the transformer 84. The other ends of both diodes are connected across the potentiometer 94. The wiper arm 100 of the potentiometer is connected to the azimuth summation point 76. The potentiometer may then be adjusted so that with no voltage applied at the summation point 76, the output of the bridge circuit is a zero between the wiper arm 100 and the center tap 102 on the transformer 84. When more than approximately six volts D.C. develops at the summation point 76 as a result of the difference in position between the target and the antenna, a half-wave signal is produced by the bridge. This signal, the blanking signal, is, since it is oscillating, passed by a blocking capacitor 104, which blocks the summed D.C. signal, amplified by amplifier 106, rectified by a diode 108, peak detected by a diode 110 and RC circuit 112 combination. Circuits identical to those described for azimuth may be traced out for elevation 114. Such circuits are a portion of the blanking means. Outputs of the elevation and azimuth peak detectors are combined by the use of peak detection diodes 110 and 116, which are also part of the blanking means, and which act as summing diodes. Since the diodes in the elevation leg 118 are the reverse of those in azimuth, the output of the peak detectors is not the sum of the elevation and azimuth difference voltages, but is instead, equivalent to the peak-to-peak voltage of the larger of the two signals.

This resultant, referred to as a blanking pulse, voltage is applied to this supressor grid 120 of the pentode 74. As previously described, the control grid 72 of this pentode receives the range gated signal from the oscillator 68. In the absence of the voltage on the supressor grid 120, the pentode passes the output of the blocking oscillator 68. However, when a sufficient mismatch voltage exists in either the azimuth or elevation channel, the A.C. voltage, the blanking pulse, produced by the bridge circuit cuts off the pentode 120. By setting the limits of the mismatch at a particular voltage, in this case six volts, before the bridge circuit is unbalanced, allow simulation of the beam width of the antenna.

The target signal now has the necessary position characteristics; i.e. range, elevation and azimuth. It is therefore suitable for application to the A, B and C scopes to be used as simulated target signals.

Obviously many modifications and variations of the present invention are possible in the light of the above teachings. It is therefore to be understood that within the scope of the appended claims the invention may be practiced otherwise than as specifically described.

What is claimed is:

1. A device for producing an electrical analog of the sweep of a radar antenna comprising an elevation scanning simulation means for producing a voltage which varies in two directions between a maximum and a minimum level, in one direction in a number of periodic steps and in the other continuously, azimuth scanning simulation means for producing a voltage which varies continuously between a maximum and a minimum level covering the entire azimuth range and having the same rate of change when the voltage decreases from a maximum to a minimum as when the voltage increases from a minimum to a maximum, while the voltage produced by said elevation scanning simulation means is at each periodic step and while it varies continuously, whereby a X–Y plot with azimuth with respect to time plotted along the horizontal, and elevation with respect to time plotted along the vertical, would show a number of horizontla parallel lines indicating azimuth joined together alternately at one end then the other by vertical lines representative of elevation, with a diagonal line joining points indicative of maximum and minimum elevation to form a continuous zigzag line joined at its extremities by a diagonal.

2. A device for producing an electrical analog of the sweep of a radar antenna, comprising a constant speed drive means, a first potentiometer means for providing a voltage varying continuously between two limits as a function of said constant speed drive means, a second potentiometer means producing a voltage varying in two directions between these two limits, in one direction a number of periodic steps and in the other as a direct function of the voltage provided by said first potentiometer means, a third potentiometer means for producing a voltage varying continuously between two limits as a function of said constant speed drive means covering the entire range between these two units, while the voltage produced by the second potentiometer means is at each periodic step and as it varies as a function of said first potentiometer means, whereby an X–Y plot with the variation in voltage produced by said second potentiometer means with time plotted along said vertical axis and the variation in voltage produced by said third potentiometer means with time is plotted along said horizontal, results in a zigzag trace with a diagonal retrace.

3. In a device for simulating the returns of electromagnetic detection devices which simultaneously produce electrical analogs of the position of target and the orientation of the detection device's antenna, a means for determining whether the target is within the beam of the antenna including difference means producing an output which is the difference between the electrical analogs for the orientation of a target and the antenna of the detection devices, blanking means for providing a blanking pulse at the output of the difference means where the difference between these analogs exceeds a certain maximum, range pulse means producing pulses indicative of range from an electrical analog of said target's range, and gating means permitting the passage of the ranging pulses only as long as no blanking pulse is generated.

4. A device for simulating an electromagnetic detection unit, which when supplied with simulated target output information representing the target's range, azimuth and elevation, the output magnitude being proportional to the information represented, determines whether a simulated target is within the range of a simulated radar antenna and whether the antenna is oriented to detect the target comprising:

a simulated radar scan means for producing a scan representation of the scan of an antenna in azimuth and elevation, having azimuth and elevation outputs which are proportional to the respective azimuth and elevation position of the simulated antenna's scan;

sawtooth means for producing a linear pulse whose length is proportional to the transmitting range of the antenna, and position along the pulse is representative of distance from the antenna;

range pulse means for producing a range pulse whenever the magnitude of the output of the sawtooth means exceeds the magnitude of the range output information of the simulated target;

azimuth comparison means for producing an output whenever the difference between the azimuth output of simulated target and the azimuth output of the radar scan means is greater than a specified minimum;

elevation comparison means producing an output whenever the difference between the elevation output of the simulated target and the elevation output of the radar scan means is greater than a specified minimum; and gating means for gating the range pulse off when the azimuth or elevation comparison means produces an output.

5. The structure of claim 4 wherein the gating means is a pentode with the range pulse fed to its grid and the outputs of the azimuth and elevation comparison means are fed to the screen grid.

6. The structure of claim 5 wherein the azimuth and range comparison means are set to produce an output at a misalignment of the antenna and target, representative of the antenna's beam width.

7. The structure of claim 4 wherein said range pulse range means includes two diodes coupled back-to-back with the free end of one diode excited by the range output of the simulated target and the other free end of the diode excited by the output of the sawtooth means.

8. The structure of claim 4 wherein said elevation and azimuth comparison means include resistive subtracting networks for subtracting the outputs of the simulated target means with the outputs of the simulated antenna scan means.

References Cited in the file of this patent
UNITED STATES PATENTS

| | | |
|---|---|---|
| 2,544,669 | Goldstein | Mar. 13, 1951 |
| 2,610,320 | Hall | Sept. 9, 1952 |
| 2,709,804 | Chance et al. | May 31, 1955 |
| 2,811,780 | Paine | Nov. 5, 1957 |